C. H. COOPER.
APPARATUS FOR LUBRICATING INTERNAL COMBUSTION ENGINES.
APPLICATION FILED JUNE 19, 1915.
1,166,816.
Patented Jan. 4, 1916.
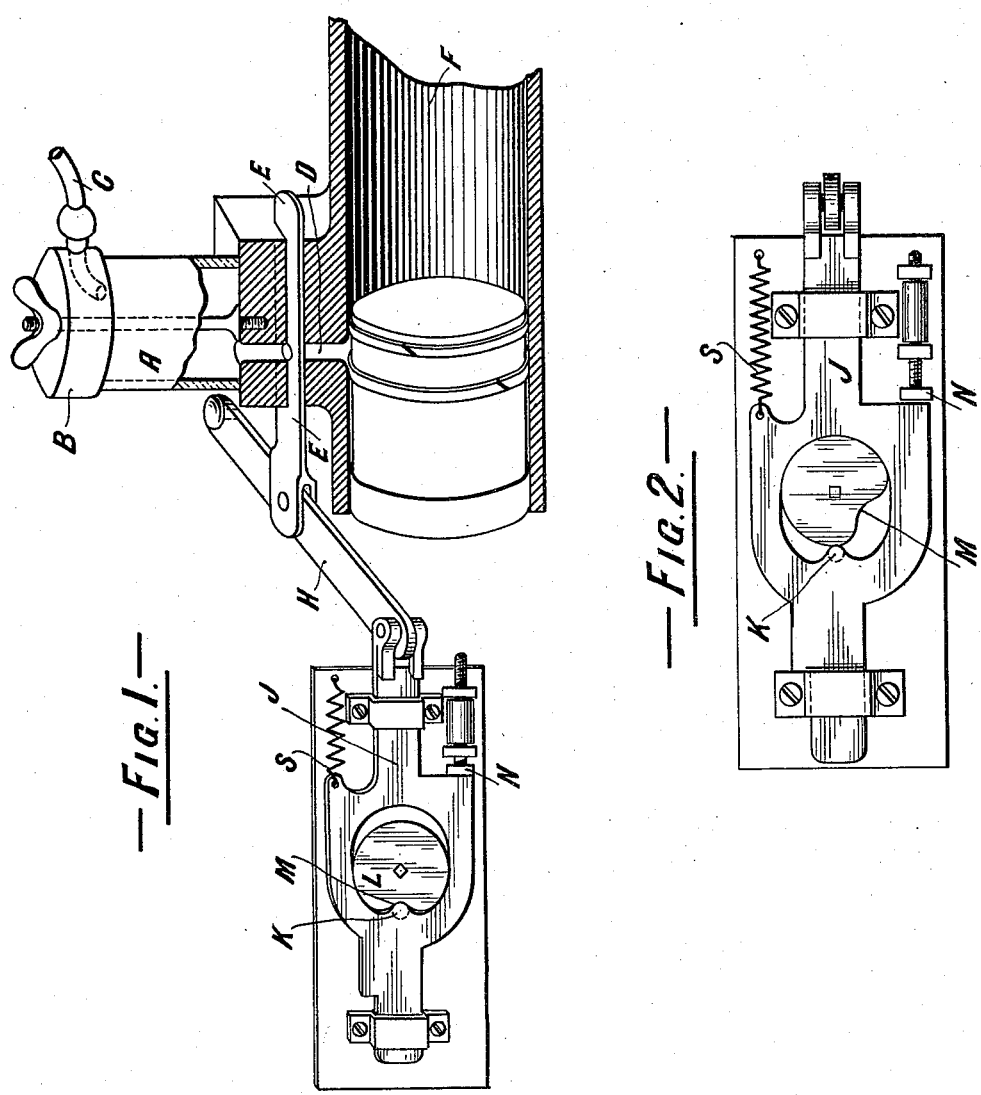

UNITED STATES PATENT OFFICE.

CHARLES HAMLET COOPER, OF WIMBLEDON, ENGLAND.

APPARATUS FOR LUBRICATING INTERNAL-COMBUSTION ENGINES.

1,166,816.  Specification of Letters Patent.  Patented Jan. 4, 1916.

Application filed June 19, 1915. Serial No. 35,147.

*To all whom it may concern:*

Be it known that I, CHARLES HAMLET COOPER, subject of the King of Great Britain, residing at 15 Dora road, Wimbledon, in the county of Surrey, England, have invented certain new and useful Improvements in Apparatus for Lubricating Internal-Combustion Engines, and of which the following is a specification.

This invention relates to means for lubricating the pistons of internal combustion engines, the object being to not only control the quantity of lubricant delivered to each piston individually, but to control the moment when the lubricant is admitted and also to control the period or length of time of its admittance, in order that each piston may be efficiently lubricated to meet its individual requirements.

Considerable difficulty has hitherto been experienced in efficient lubrication, and if the lubricant is admitted continuously, considerable carbon is formed by the burning of the lubricant, which when carbonized is not only wasted, but its presence in the form of carbon is a hindrance to the efficient working of the engine.

According to this invention the lubricant, which may be either in liquid or plastic form is maintained under pressure in a reservoir and admitted to the cylinder by way of a valve which is operated either by the half-time shaft or by a shaft revolving once in every one or more revolutions of the half-time shaft and so permits the valve to open either once to every cycle of the engine, or once in every two or more cycles of the engine, at a predetermined position of the piston in the cycle of movements of the engine, and the extent of opening of the valve is capable of adjustment and control. The lubricant is thus not admitted continuously, but intermittently at a predetermined position in the cycle of movements of each piston, the said period being chosen when, owing to a lower temperature in the cylinder, the lubricant can be distributed on the interior wall thereof with less likelihood of carbonization. Thus, the best moment, so far as my experiments have shown, for admitting the lubricant, is at the end of the explosion stroke, but the invention is not limited to this particular moment in the cycle of the engine, as any other moment may be chosen should it admit of the distribution of the lubricant with the least liability of carbonization taking place.

The operation of the valve at the predetermined moment is suitably effected by a cam attached to the half-time shaft or shaft revolving once in every one or more revolutions of the half-time shaft. Against this cam a slide is pressed by a spring; the slide is so formed that it can sink into a depression formed in the cam, so that as the cam rotates the slide is suddenly oscillated when the depression in the cam comes opposite the portion of the slide pressed against the cam. This oscillation is transmitted by means of a lever so as to open or partly open and close the valve admitting lubricant to the cylinder. The extent of this oscillation is regulated by a stop which can be adjusted by a screw sleeve.

The valve may suitably be one of sliding type, or one having an angular motion about an axis on which it rocks. In either case, however, the amount of movement imparted to it determines the extent to which the valve is opened at each operation.

In the accompanying drawings, Figure 1 is a diagram showing a cylinder in part section with the lubricating control mechanism applied thereto, and Fig. 2 is a detail view of the controlling mechanism illustrated also in Fig. 1.

A is a reservoir containing lubricant which may consist of a glass cylinder, being closed at its upper end by an air-tight cap B.

C is a tube for admitting compressed air to the upper surface of the lubricant.

D is a passage from the lubricant reservoir A to the interior of the cylinder F.

E is a sliding valve, which by sliding opens or closes the passage D. The valve E is connected to a lever H which is actuated by a slide J; this slide is given an oscillatory movement by means of a cam L, which continuously rotates while the engine is working. The projection K of the slide J is pressed against the cam L by a spring S so that as the cam rotates the projecting part K of the slide J falls into the depression M in the cam and so causes the oscillatory movement which operates the valve E.

It will be readily seen that when a stop N is adjusted to the position shown in Fig. 2 the cam L is free to rotate without imparting movement to the slide J and consequently the passage D remains closed, both during the working of the engine and when the engine is not running. When, however, the stop N is adjusted toward the position shown in Fig. 1, the projection K on the slide J is permitted to enter or partly enter the depression M in the cam L under the influence of the spring S and the extent of adjustment imparted to the stop N controls the extent to which the passage D is opened.

If the cam L be carried on the half-time shaft, the valve E will be operated once in every cycle of operations of the engine, and if it be carried on an auxiliary shaft then it may be operated once to every two or more cycles. The position of adjustment of the cam L relatively to the half-time shaft permits of adjustment of the moment of delivery of the lubricant relatively to the cycle of the engine, and, as before referred to, this moment may suitably be chosen to coincide with the end of the explosion stroke of the piston.

Any suitable means may be employed for subjecting the lubricant to a continuous pressure, and such means may suitably consist of air compressed by a pump, which may be driven by the engine if desired, or instead of employing compressed air, a spring-operated piston may be applied to the surface of the lubricant.

Various modifications can be made in the construction of apparatus according to this invention, so long as a controllable amount of lubricant is intermittently admitted under pressure to the cylinder, the moment of admission bearing a constant relation to some period in the cycle of working of the engine, in order to permit of the entry of the lubricant at a time when carbonization is least likely to occur.

By the employment of this invention where lubricating multi-cylinder engines, independent lubrication to each cylinder may be obtained, by cams each separately adjustable to suit the particular requirement of each cylinder, or a single cam can be employed for operating the slides controlling the supply of lubricant to two or more cylinders.

What I claim as my invention and desire to secure by Letters Patent is:—

1. In apparatus for lubricating the cylinders of internal combustion engines; a reservoir containing lubricant under pressure, said reservoir having a passage therefrom communicating with the interior of the cylinder, a valve to control said passage, a shaft receiving rotary motion from the engine, a rotary cam fixed on said shaft, means coacting between said cam and said valve to operate said valve in order to admit lubricant to the cylinder intermittently at a predetermined position in the cycle of movements of the piston, and means for regulating the extent of movement of said valve to control the quantity of lubricant admitted.

2. In apparatus for lubricating the cylinders of internal combustion engines; a reservoir containing lubricant under pressure, said reservoir having a passage therefrom communicating with the interior of the cylinder, a valve to control said passage, a shaft receiving rotary motion from the engine, a rotary cam fixed on said shaft, means coacting between said cam and said valve to operate said valve in order to admit lubricant to the cylinder intermittently at a predetermined position in the cycle of movements of the piston, a spring to move said valve in one direction against the action of said cam, and an adjustable abutment to limit the motion of said valve to control the quantity of lubricant admitted.

3. In apparatus for lubricating the cylinders of internal combustion engines; a reservoir containing lubricant under pressure, said reservoir having a passage therefrom communicating with the interior of the cylinder, a valve to control said passage, a shaft receiving rotary motion from the engine, a rotary cam fixed on said shaft, a slide moved in one direction by said cam, a spring to hold said slide against said cam, an adjustable abutment to regulate the extent of movement of said slide, and means coacting between said slide and said valve to operate said valve in order to admit lubricant to the cylinder intermittently at a predetermined position in the cycle of movements of the piston.

In witness whereof I have hereunto set my hand in the presence of two witnesses.

CHARLES HAMLET COOPER.

Witnesses:
 THOMAS W. ROGERS,
 WILLIAM A. MARSHALL.

Copies of this patent may be obtained for five cents each, by addressing the "Commissioner of Patents, Washington, D. C."